United States Patent
Ogaki

(10) Patent No.: US 12,214,697 B2
(45) Date of Patent: Feb. 4, 2025

(54) BATTERY TEMPERATURE ADJUSTMENT SYSTEM

(71) Applicant: HONDA MOTOR CO., LTD., Tokyo (JP)

(72) Inventor: Toru Ogaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 193 days.

(21) Appl. No.: 18/098,410

(22) Filed: Jan. 18, 2023

(65) Prior Publication Data

US 2023/0234474 A1 Jul. 27, 2023

(30) Foreign Application Priority Data

Jan. 21, 2022 (JP) .................... 2022-008037

(51) Int. Cl.
*B60L 58/26* (2019.01)
*B60L 50/64* (2019.01)
(Continued)

(52) U.S. Cl.
CPC .............. *B60L 58/26* (2019.02); *B60L 50/64* (2019.02); *B60L 58/16* (2019.02); *H01M 10/425* (2013.01); *H01M 10/613* (2015.04); *H01M 10/625* (2015.04); *H01M 10/633* (2015.04); *B60L 7/10* (2013.01); *B60L 58/24* (2019.02); *B60L 58/27* (2019.02); *H01M 2010/4271* (2013.01); *H01M 2220/20* (2013.01); *H02J 7/005* (2020.01)

(58) Field of Classification Search
CPC ............ B60H 1/00278; B60H 1/00385; B60H 1/00392; B60H 1/004; B60H 1/00428; B60L 58/16; B60L 58/24; B60L 58/26
See application file for complete search history.

(56) References Cited

U.S. PATENT DOCUMENTS

2020/0231060 A1* 7/2020 Matsuyama ............ B60L 53/62

FOREIGN PATENT DOCUMENTS

JP 2015-037011 A 2/2015
WO WO 2020/218268 A1 10/2020

OTHER PUBLICATIONS

May 23, 2023, Translation of Japanese Office Action issued for related JP Application No. 2022-008037.

* cited by examiner

*Primary Examiner* — Jonathan Bradford
(74) *Attorney, Agent, or Firm* — Paratus Law Group, PLLC

(57) ABSTRACT

A battery temperature adjustment system includes: a battery; a cooling device to which electric power from an external power source and electric power from the battery are selectively supplied and configured to cool the battery; and a control device configured to control the cooling device to adjust a state of charge of the battery and a battery temperature. The control device stores a deterioration sensitivity map in which a deterioration sensitivity is preset according to the state of charge and the battery temperature, or is configured to calculate a deterioration sensitivity according to the state of charge and the battery temperature, and when a vehicle is connected to the external power source, the control device selects either the electric power from the battery or the electric power from the external power source based on the deterioration sensitivity to operate the cooling device.

5 Claims, 6 Drawing Sheets

(51) Int. Cl.
    *B60L 58/16*           (2019.01)
    *H01M 10/42*         (2006.01)
    *H01M 10/613*       (2014.01)
    *H01M 10/625*       (2014.01)
    *H01M 10/633*       (2014.01)
    *B60L 7/10*            (2006.01)
    *B60L 58/24*          (2019.01)
    *B60L 58/27*          (2019.01)
    *H02J 7/00*            (2006.01)

BATTERY TEMPERATURE ADJUSTMENT SYSTEM

CROSS-REFERENCE TO RELATED APPLICATIONS

The present application claims the benefit of priority of Japanese Patent Application No. 2022-008037, filed on Jan. 21, 2022, the content of which is incorporated herein by reference.

TECHNICAL FIELD

The present disclosure relates to a battery temperature adjustment system that adjusts a temperature of a battery mounted on an electric vehicle or the like.

BACKGROUND ART

In recent years, as a specific measure against climatic variation of the earth, efforts to realize a low-carbon society or a decarbonized society have been actively made. Also in vehicles, a reduction in $CO_2$ emission amount is strongly required, and a drive source is rapidly electrified. Specifically, a vehicle including an electric motor as a drive source of the vehicle and a battery as a secondary battery capable of supplying electric power to the electric motor, such as an electrical vehicle or a hybrid electrical vehicle, has been developed.

In general, deterioration of a battery progresses when the battery is in a high temperature and high state of charge (SOC) state. JP-A-2015-037011 discloses a battery control device that prevents a battery from being subjected to a high temperature and high SOC state while a system of a vehicle is stopped, in order to prevent deterioration of the battery. Specifically, when the battery control device of JP-A-2015-037011 detects that the battery is in the high temperature and high SOC state for a predetermined number of times or more at predetermined time intervals, the battery control device operates an accessory of the vehicle (for example, a battery cooling fan) to discharge the battery.

In addition, in the related art, in a state where a vehicle is connected to an external power source (that is, in a plug-in state), a cooling device for cooling a battery is configured to be operated by electric power from the external power source.

However, in order to prevent deterioration of the battery in the high temperature and high SOC state, it may not always be advantageous to cool the battery by electric power from the external power source.

SUMMARY

The present disclosure provides a battery temperature adjustment system capable of appropriately preventing deterioration of a battery.

According to an aspect of the present disclosure, there is provided a battery temperature adjustment system including: a battery configured to store electric power from an external power source, and supply electric power to a motor as a drive source of a vehicle; a cooling device to which the electric power from the external power source and the electric power from the battery are selectively supplied and configured to cool the battery; and a control device configured to control the cooling device to adjust a state of charge of the battery and a battery temperature, where: the control device stores a deterioration sensitivity map in which a deterioration sensitivity is preset according to the state of charge and the battery temperature, or is configured to calculate a deterioration sensitivity according to the state of charge and the battery temperature; and when the vehicle is connected to the external power source, the control device selects either the electric power from the battery or the electric power from the external power source based on the deterioration sensitivity to operate the cooling device.

According to the present disclosure, deterioration of a battery can be appropriately prevented.

DESCRIPTION OF EMBODIMENTS

A battery temperature adjustment system according to an embodiment of the present disclosure will be described below with reference to the drawings.

[Vehicle]

Figure 1:
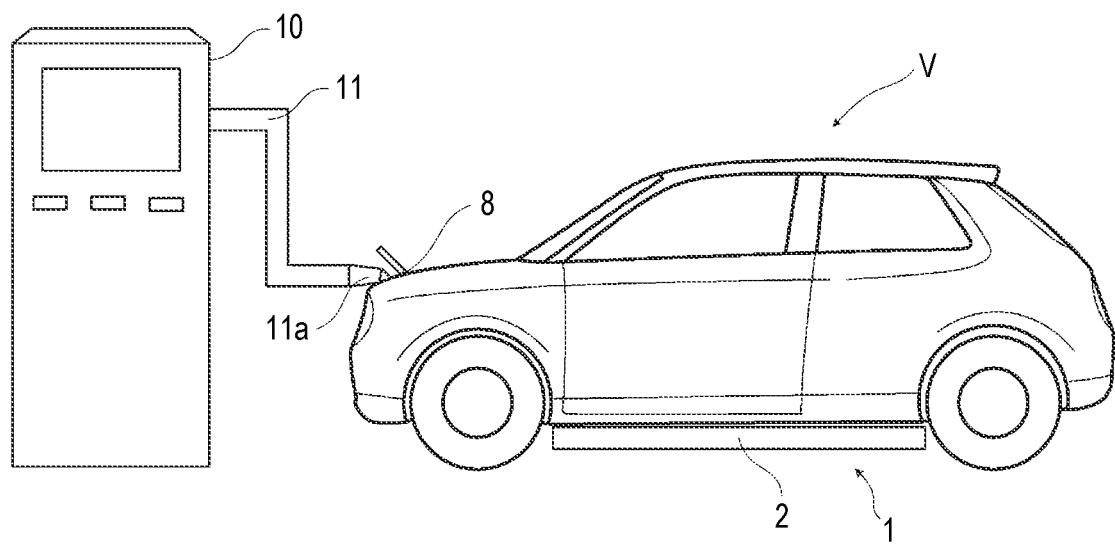
FIG. 1 is a schematic diagram showing a vehicle mounted with a battery temperature adjustment system of the present disclosure.
Figure 2:
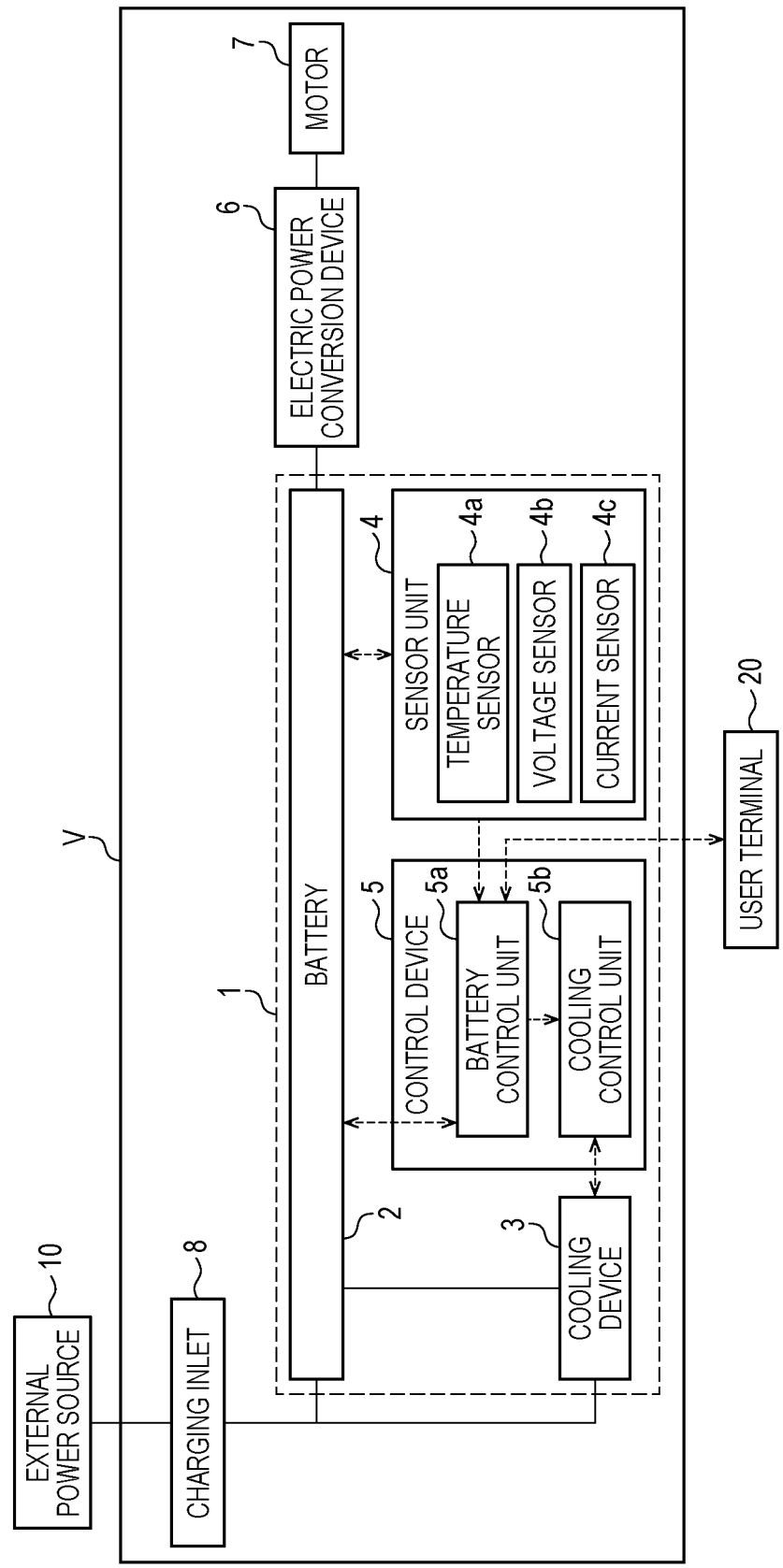
FIG. 2 is a block diagram showing a configuration of the battery temperature adjustment system of the present disclosure.

As shown in FIGS. 1 and 2, a battery temperature adjustment system 1 according to the present embodiment is mounted on a vehicle V. The vehicle V is, for example, an electric vehicle such as a plug-in hybrid vehicle or an electrical vehicle, and is configured such that a battery 2 can store electric power from an external power source 10 provided at a charging station, at home, or the like. The vehicle V is configured to be able to travel by driving a motor 7 as a drive source by the electric power stored in the battery 2.

The vehicle V is connected to (plugged into) the external power source 10 by connecting, to a charging inlet 8 provided in the vehicle V, a charging plug 11a of a charging cable 11 extending from the external power source 10. It should be noted that the connection between the vehicle V and the external power source 10 is not limited thereto. For example, the vehicle V may be provided with an electric power receiving coil or the like capable of contactlessly receiving electric power transmitted from the external power source 10.

The vehicle V is configured to be able to communicate with a user terminal 20 held by a user. The user terminal 20 is, for example, a smartphone or a tablet terminal that can be carried by the user, and may be a navigation device installed in the vehicle V. The user can set an upper limit of a state of charge (hereinafter also referred to as SOC) of the battery 2 by the user terminal 20, and the set upper limit of the SOC is stored in a battery control unit 5a described later. For example, when the user desires a high SOC state in order to increase a travelable distance of the vehicle V, the user can set the upper limit of the SOC to a high level in advance.

[Battery Temperature Adjustment System]

The battery temperature adjustment system 1 includes the battery 2, a cooling device 3 that cools the battery 2, a sensor unit 4 that detects a state of the battery 2, and a control device 5 that controls the cooling device 3.

The battery 2 is formed by stacking a plurality of battery cells (not shown), and is, for example, a lithium ion battery or a nickel metal hydride battery. The battery 2 is connected to the external power source 10 by connecting the charging plug 11a to the charging inlet 8, and is configured to be able to store the electric power from the external power source 10. The electric power stored in the battery 2 is converted from a direct current into an alternating current by an inverter included in an electric power conversion device 6, and is supplied to the motor 7. In addition, when an alternating current generated by the motor 7 during braking of the vehicle V is input to the electric power conversion device 6, the alternating current is converted to a direct current by the inverter and supplied to the battery 2. That is, the battery 2 is configured to be able to store regenerated electric power.

The cooling device 3 cools the battery 2 by causing a refrigerant to flow through a refrigerant flow channel provided in the battery 2. The cooling device 3 is, for example, a water-cooled type, circulates the refrigerant by a pump, and cools the refrigerant by a radiator. It should be noted that a heater is provided in the cooling device 3, and the battery 2 can also be heated.

The electric power stored in the battery 2 is supplied to the cooling device 3. In addition, when the vehicle V is connected to the external power source 10, the electric power from the external power source 10 can be supplied to the cooling device 3. Although details will be described later, when the vehicle V is connected to the external power source 10, the electric power from the external power source 10 and the electric power from the battery 2 are selectively supplied to the cooling device 3 according to the present embodiment.

The sensor unit 4 includes a temperature sensor 4a that acquires a temperature of the battery 2 (hereinafter also referred to as battery temperature), a voltage sensor 4b that measures a voltage of the battery 2, and a current sensor 4c that measures a current flowing through the battery 2.

The control device 5 includes the battery control unit 5a that controls charging and discharging of the battery 2 and a cooling control unit 5b that controls the cooling device 3. For example, the control device 5 is implemented by an electronic control unit (ECU) including a processor, a memory, an interface, and the like. It should be noted that the battery control unit 5a and the cooling control unit 5b may be configured as separate control devices.

The battery temperature, the voltage of the battery 2, the current of the battery 2, and the like are input from the sensor unit 4 to the battery control unit 5a. In addition, the battery control unit 5a calculates the SOC of the battery 2 based on the input voltage and current. The battery control unit 5a controls charging and discharging of the battery 2 based on these input values and the SOC.

The battery control unit 5a stores in a memory or the like a deterioration sensitivity map (see FIGS. 3 and 4) in which a deterioration sensitivity of the battery 2 is preset according to the SOC and the battery temperature. Details of the deterioration sensitivity and the deterioration sensitivity map will be described later.

The cooling control unit 5b operates the cooling device 3 such that the battery temperature is within a predetermined temperature range. In addition to operating the cooling device 3 while the vehicle V is traveling, the cooling control unit 5b operates the cooling device 3 such that the battery temperature is maintained within the predetermined temperature range when the battery temperature exceeds the predetermined temperature range even while the vehicle V is parked. The time when the battery temperature exceeds the predetermined temperature range while the vehicle V is parked corresponds to, for example, a time when the vehicle V is parked in a high temperature environment for a certain period of time.

A cooling device in the related art is configured to be operated by electric power supplied from an external power source when a vehicle is connected to the external power source, and does not consume electric power of a battery during cooling. On the other hand, the cooling device 3 according to the present embodiment is configured such that even when the vehicle V is connected to the external power source 10, either the electric power from the external power source 10 or the electric power from the battery 2 is selected based on the deterioration sensitivity, and the cooling device 3 can be operated by the selected electric power.

The deterioration sensitivity represents a degree of tendency toward deterioration of the battery 2 per unit time. The higher the deterioration sensitivity, the more likely the deterioration per unit time progresses, and the lower the deterioration sensitivity, the less likely the deterioration per unit time progresses. The deterioration sensitivity is set according to the state of charge of the battery 2 and the battery temperature. The deterioration sensitivity can be obtained from a deterioration sensitivity map in which preset deterioration sensitivities are mapped. In addition, the deterioration sensitivity may be sequentially calculated based on a preset formula or the like. In the following description, control for cooling the battery 2 will be described by taking, as an example, a case in which the deterioration sensitivity is obtained from the deterioration sensitivity map.

[Deterioration Sensitivity Map]

A deterioration sensitivity map of the batter 2 stored in the battery control unit 5a will be described with reference to FIGS. 3 and 4. It should be noted that deterioration sensitivity maps shown in FIGS. 3 and 4 are examples, and the deterioration sensitivity map also changes according to a battery to be used.

In the deterioration sensitivity map, a horizontal axis represents a battery temperature T and a vertical axis represents the SOC, and the deterioration sensitivity map shows a deterioration sensitivity preset according to the battery temperature and an SOC value. The battery temperature T is increased toward a right side of the drawings, and the SOC is increased toward an upper side of the drawings. The deterioration sensitivity takes a value between 0 and 1, and the lower the deterioration sensitivity, the less likely the deterioration of the battery 2 per unit time progresses, that is, the higher the deterioration prevention effect of the battery 2.

Figure 3:
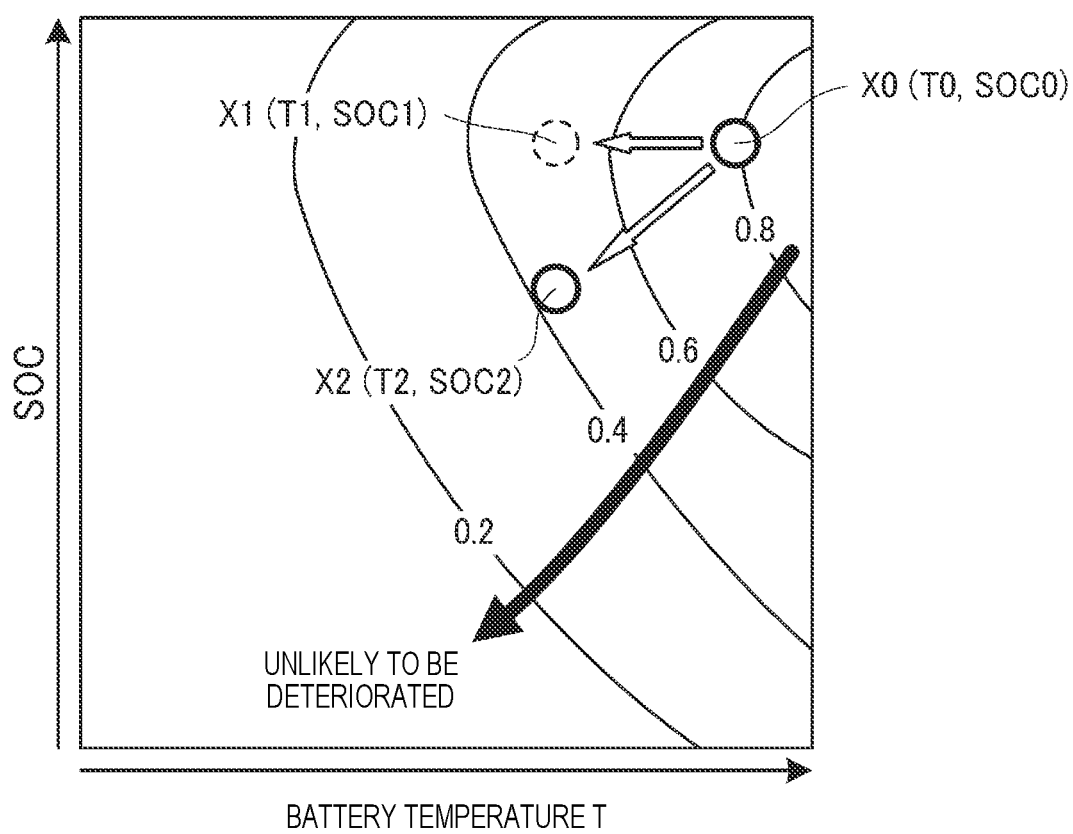
FIG. 3 is a graph showing a case in which in a deterioration sensitivity map indicating deterioration sensitivities of a battery according to a battery temperature and SOC, a deterioration sensitivity X2 at a second estimated value is lower than a deterioration sensitivity X1 at a first estimated value.
Figure 4:
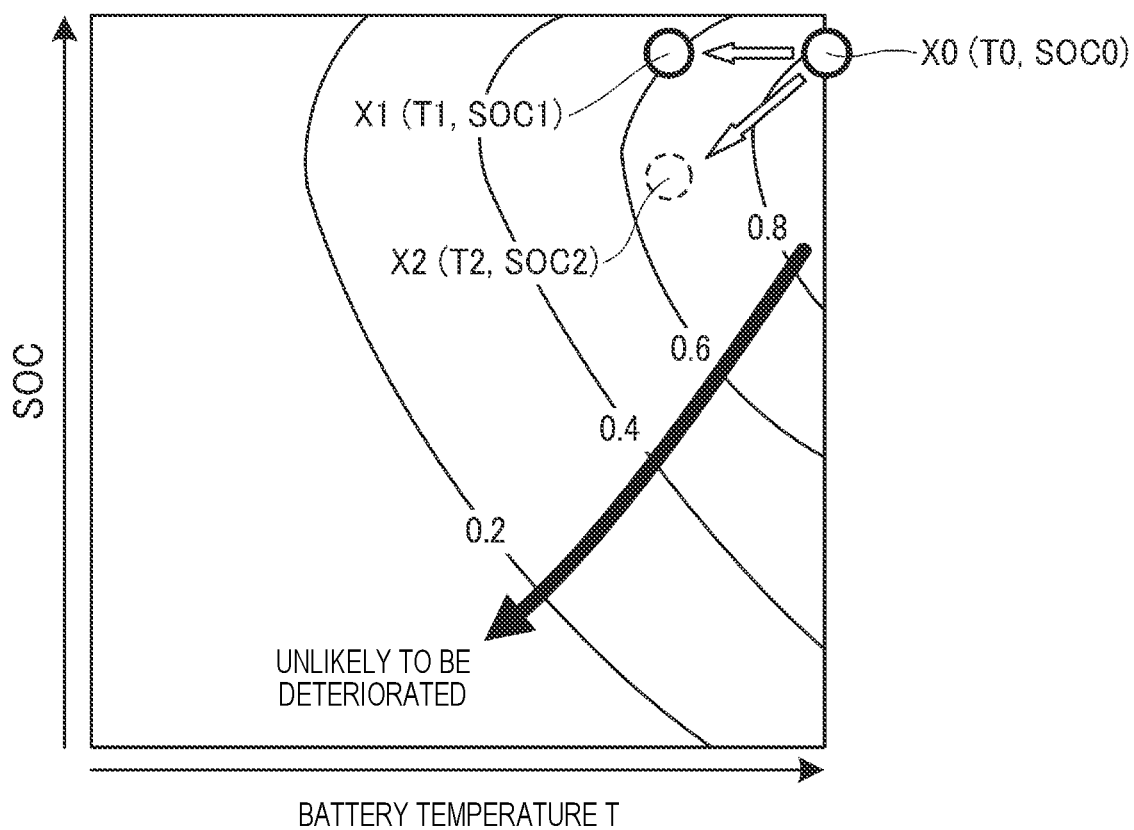
FIG. 4 is a graph showing a case in which in the deterioration sensitivity map indicating the deterioration sensitivities of the battery according to the battery temperature and the SOC, the deterioration sensitivity X1 at the first estimated value is lower than the deterioration sensitivity X2 at the second estimated value.

FIGS. 3 and 4 each show a state where the battery 2 is currently in a high temperature and high SOC state (T0, SOC0) and a current deterioration sensitivity X0 is high (that is, the battery 2 is easily deteriorated). Here, the high temperature means that the temperature of the battery 2 is higher than a predetermined temperature range (for example, around 40° C.), and the high SOC means that the SOC of the battery 2 is higher than a predetermined SOC range (for example, around 80%).

When the vehicle V is connected to the external power source 10, the battery control unit 5a estimates an estimated value (T1, SOC1) of the battery temperature and the SOC after cooling when the cooling device 3 is operated by the electric power from the external power source 10. In this case, since the electric power of the battery 2 is not consumed during cooling, the SOC1 is the same as the current SOC0. In addition, the battery control unit 5a estimates an estimated value (T2, SOC2) of the battery temperature and the SOC after cooling when the cooling device 3 is operated by the electric power from the battery 2. In this case, since the electric power of the battery 2 is consumed during cooling, the SOC2 is lower than the current SOC1. It should be noted that in the present embodiment, it is assumed that the estimated values of the battery temperature T1 and T2 are the same value.

In FIG. 3, the deterioration sensitivity X2 at the estimated value (T2, SOC2) is lower than the deterioration sensitivity X1 at the estimated value (T1, SOC1). That is, the deterioration of the battery 2 can be prevented by operating the cooling device 3 by the electric power from the battery 2 rather than the electric power from the external power source 10. On the other hand, in FIG. 4, the deterioration sensitivity X1 at the estimated value (T1, SOC1) is lower than the deterioration sensitivity X2 at the estimated value (T2, SOC2). That is, the deterioration of the battery 2 can be prevented by operating the cooling device 3 by the electric power from the external power source 10 rather than the electric power from the battery 2.

[Control Flows]

Figure 5:
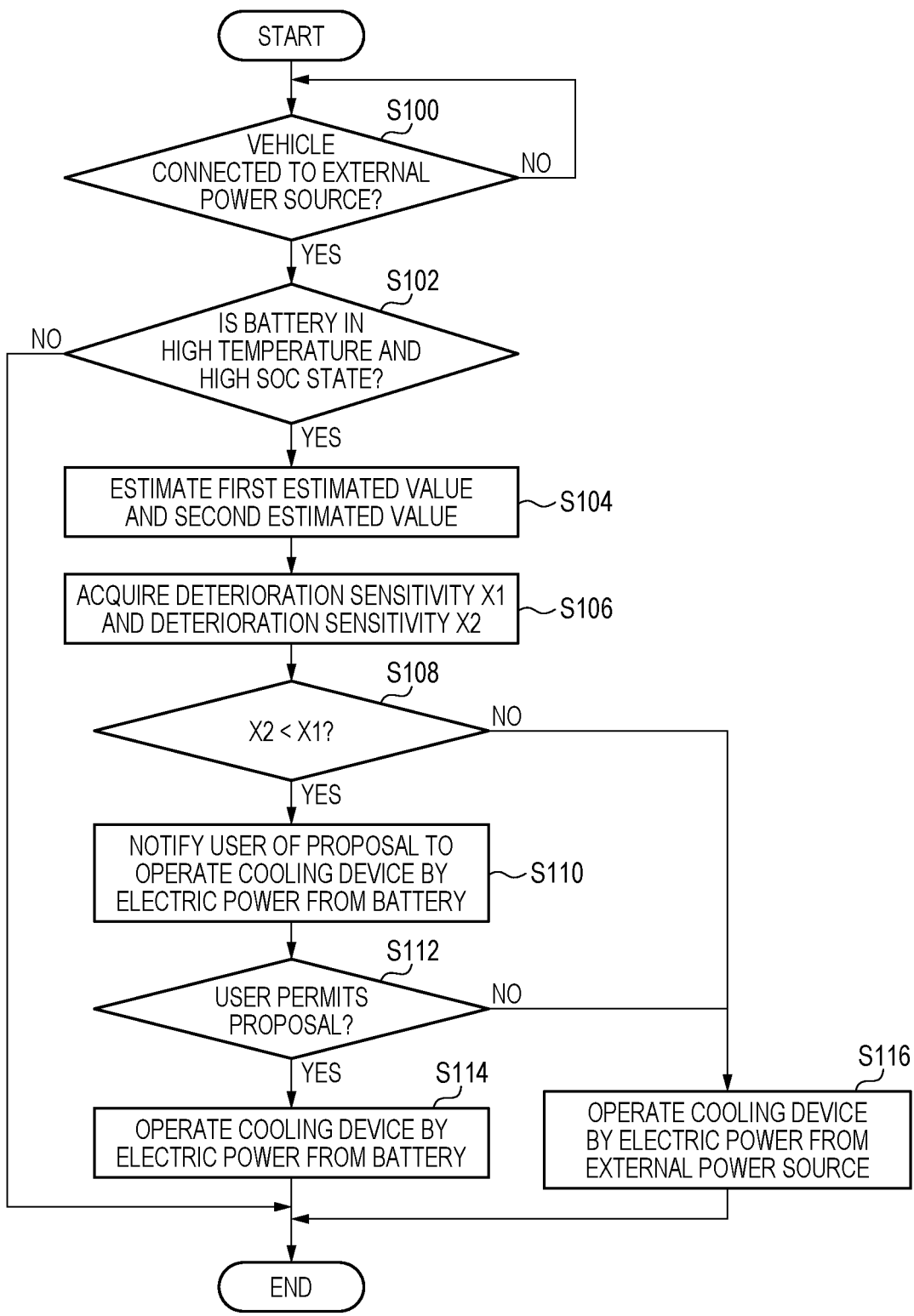
FIG. 5 is a diagram showing control flows executed by a control device.

Next, the control flows executed by the control device 5 will be described with reference to FIG. 5.

In step S100, the battery control unit 5a determines Whether the vehicle V is connected to the external power source 10. When the vehicle V is not connected to the external power source 10 (NO), the process returns to step S100 again and monitors until the vehicle V is connected to the external power source 10. When the vehicle V is connected to the external power source 10 (YES), the process proceeds to step S102.

In step S102, the battery control unit 5a determines whether the battery 2 is in a high temperature and high SOC state. Specifically, it is determined whether the battery temperature is higher than the predetermined temperature range and the SOC is higher than the predetermined SOC range. When the battery 2 is not in the high temperature and high SOC state (NO), the control flows according to the present embodiment end. When the battery 2 is in the high temperature and high SOC state (YES), the process proceeds to step S104.

In step S104, the battery control unit 5a estimates the estimated value (T1, SOC1) of the battery temperature and the SOC after cooling when the cooling device 3 is operated by the electric power from the external power source 10, and the estimated value (T2, SOC2) of the battery temperature and the SOC after cooling when the cooling device 3 is operated by the electric power from the battery 2. Here, the estimated value (T1, SOC1) corresponds to the "first estimated value" in the present disclosure, and the estimated value (T2, SOC2) corresponds to the "second estimated value" in the present disclosure.

Subsequently, in step S106, the battery control unit 5a acquires the deterioration sensitivity X1 at the estimated value (T1, SOC1) and the deterioration sensitivity X2 at the estimated value (T2, SOC2) with reference to the deterioration sensitivity map, and the process proceeds to step S108.

In step S108, the battery control unit 5a compares the deterioration sensitivity X1 and the deterioration sensitivity X2. For example, as shown in FIG. 3, when the deterioration sensitivity X2 is lower than the deterioration sensitivity X1, that is, when an deterioration prevention effect in a case of operating the cooling device 3 by the electric power from the battery 2 is higher than an deterioration prevention effect in a case of operating the cooling device 3 by the electric power from the external power source 10 (YES), the process proceeds to step S110. On the other hand, for example, as shown in FIG. 4, when the deterioration sensitivity X2 is equal to or higher than the deterioration sensitivity X1, the process proceeds to step S116. In step S116, the battery control unit 5a sends to the cooling control unit 5b command to operate the cooling device 3 by the electric power from the external power source 10. The cooling control unit 5b operates the cooling device 3 by the electric power from the external power source 10, and the control flows according to the present embodiment end. It should be noted that when the deterioration sensitivity X1 and the deterioration sensitivity X2 are equal in step S108, the process may proceed to step S110 instead of step S116.

In step S110, the battery control unit 5a notifies the user terminal 20 of a proposal to operate the cooling device 3 by the electric power from the battery 2 by lowering an SOC upper limit preset by the user. By notifying the user of such a proposal, it is possible to prevent the SOC upper limit of the battery 2 from being lowered without the user being aware of it, thereby preventing the SOC from being lowered. It should be noted that the lowering of the SOC upper limit may be a temporary lowering, or may be a lowering until the user resets the SOC upper limit, After the above proposal is notified to the user terminal 20, the process proceeds to step S112.

In step S112, the battery control unit 5a determines whether the user permits the above proposal. When the user does not permit the above proposal (NO), the process proceeds to step S116 described above, and the battery control unit 5a sends to the cooling control unit 5b the command to operate the cooling device 3 by the electric power from the external power source 10. The cooling control unit 5b operates the cooling device 3 by the electric power from the external power source 10, and the control flows according to the present embodiment end. In this way, it is possible to select an electric power source for the cooling device according to the intention of the user. On the other hand, when the user permits the above proposal (YES), the process proceeds to step S114.

In step S114, the battery control unit 5a lowers the SOC upper limit of the battery 2 to allow the electric power of the battery 2 to be consumed during cooling (that is, the SOC of the battery 2 to be lowered). Then, the battery control unit 5a sends to the cooling control unit 5b a command to operate the cooling device 3 by the electric power from the battery 2. The cooling control unit 5b operates the cooling device 3 by the electric power from the battery 2, and the control flows according to the present embodiment end.

As described above, according to the present embodiment, when the vehicle V is connected to the external power source 10, the deterioration sensitivity X1 and the deterioration sensitivity X2 are compared to select either the electric power from the battery 2 or the electric power from the external power source 10 to operate the cooling device 3. By selecting an electric power source for the cooling device 3 in consideration of the deterioration sensitivity in this manner, the deterioration of the battery 2 can be appropriately prevented.

In addition, since the battery 2 is cooled by permitting the lowering of the SOC upper limit of the battery 2 only when the permission of the user is obtained, it is possible to prevent the SOC upper limit of the battery 2 from being lowered without the user being aware of it.

Although the case of maintaining the SOC of the battery 2 and the case of lowering the SOC of the battery 2 have been described in the above embodiment, it is also possible to increase the SOC by storing electric power in the battery 2 while the battery 2 is cooled by the electric power from the external power source 10.

Figure 6:
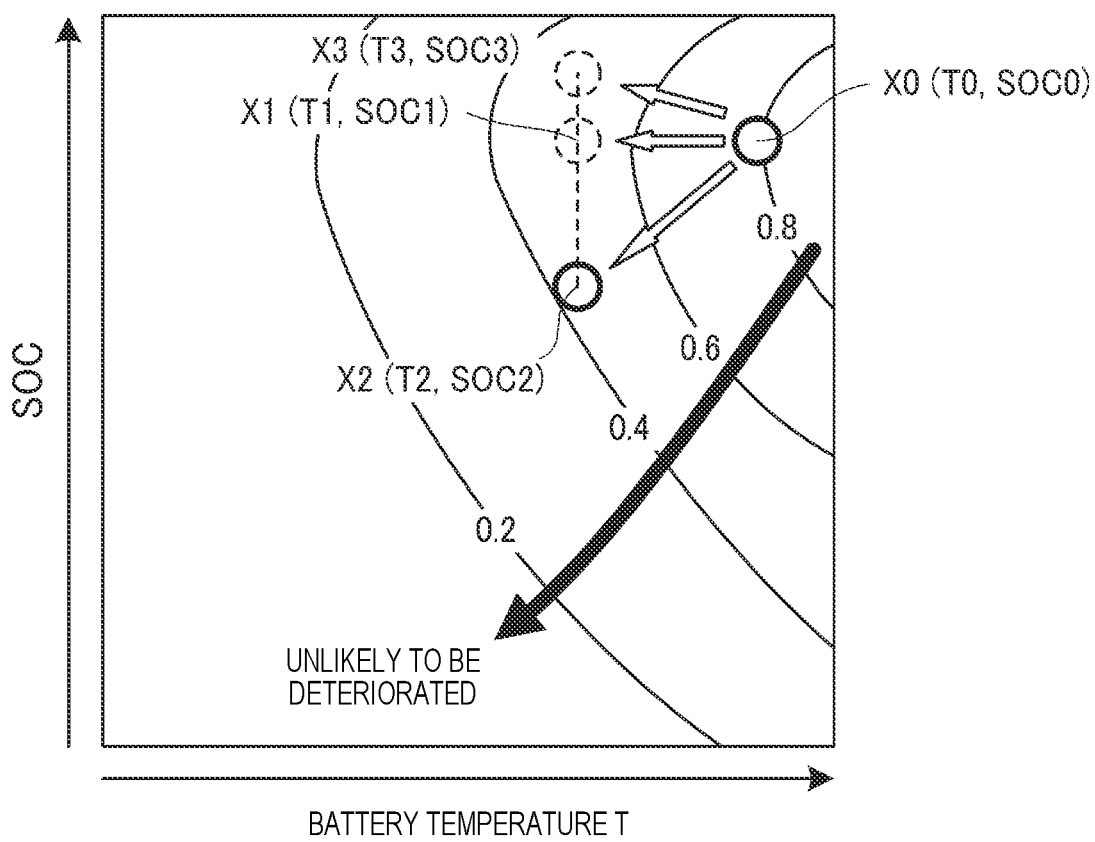
FIG. 6 is a graph showing a case in which in the deterioration sensitivity map indicating the deterioration sensitivity of the battery according to the battery temperature and the SOC, the deterioration sensitivity X1 is the lowest among deterioration sensitivities X1 to X3.

In addition to FIG. 3, FIG. 6 is a diagram showing an estimated value (T3, SOC3) of the battery temperature and the SOC after cooling and a deterioration sensitivity X3 at the estimated value (T3, SOC3) when the cooling device 3 is operated by the electric power from the external power source 10 and electric power is stored in the battery 2. When the battery temperature is lowered to the predetermined temperature range, the control device 5 may compare the deterioration sensitivities X1 to X3 and acquire a deterioration sensitivity (X2 in FIG. 6) having the highest deterioration prevention effect. The control device 5 selects either the electric power from the battery 2 or the electric power from the external power source 10 based on the deterioration sensitivity having the highest deterioration prevention effect to operate the cooling device 3.

Although an embodiment of the present disclosure has been described above with reference to the accompanying drawings, it is needless to say that the present disclosure is not limited to the embodiment. It is apparent to those skilled in the art that various changes and modifications can be conceived within the scope of the claims, and it is also understood that such changes and modifications naturally belong to the technical scope of the present disclosure. In addition, constituent elements in the above embodiment may be freely combined without departing from the spirit of the disclosure.

In the above embodiment, in step S108, when the deterioration sensitivity X2 is lower than the deterioration sensitivity X1, the process proceeds to step S110 and step S112, and the user is notified of the proposal to operate the cooling device 3 by the electric power from the battery 2 by lowering the SOC upper limit of the battery 2, but the present disclosure is not limited thereto. For example, the process may directly proceed to step S114 without performing steps S110 and S112, and the control device 5 may operate the cooling device 3 by the electric power from the battery 2.

At least the following matters are described in the present specification. In the parentheses, the corresponding constituent elements and the like in the above embodiment are shown as an example, and the present disclosure is not limited thereto.

(1) A battery temperature adjustment system (battery temperature adjustment system 1), including:
    a battery (battery 2) configured to store electric power from an external power source (external power source 10), and supply electric power to a motor (motor 7) as a drive source of a vehicle (vehicle V);
    a cooling device (cooling device 3) to which the electric power from the external power source and the electric power from the battery are selectively supplied and configured to cool the battery; and
    a control device (control device 5) configured to control the cooling device to adjust
    a state of charge of the battery and a battery temperature, in which the control device
        stores a deterioration sensitivity map in which a deterioration sensitivity is preset according to the state of charge and the battery temperature, or is capable of calculating a deterioration sensitivity according to the state of charge and the battery temperature, and
        selects, when the vehicle is connected to the external power source, either the electric power from the battery or the electric power from the external power source based on the deterioration sensitivity to operate the cooling device.

According to (1), when the vehicle is connected to the external power source, the control device selects either the electric power from the battery or the electric power from the external power source based on the deterioration sensitivity to operate the cooling device. Accordingly, since an electric power source for the cooling device can be selected in consideration of the deterioration sensitivity, the deterioration of the battery can be appropriately prevented.

(2) The battery temperature adjustment system according to (1), in which
    the control device estimates
        a first estimated value (estimated value (T1, SOC1)) of the state of charge and the battery temperature after cooling when the cooling device is operated by the electric power from the external power source, and
        a second estimated value (estimated value (T2, SOC2)) of the state of charge and the battery temperature after cooling when the cooling device is operated by the electric power from the battery,
    when the vehicle is connected to the external power source, the control device
        operates the cooling device by the electric power from the battery when the deterioration sensitivity at the second estimated value (deterioration sensitivity X2) is lower than the deterioration sensitivity at the first estimated value (deterioration sensitivity X1), and
        operates the cooling device by the electric power from the external power source when the deterioration sensitivity at the first estimated value is lower than the deterioration sensitivity at the second estimated value.

According to (2), by comparing the deterioration sensitivity at the first estimated value and the deterioration sensitivity at the second estimated value to select an electric power source for the cooling device, the deterioration of the battery can be appropriately prevented.

(3) The battery temperature adjustment system according to (2), in which
    when the deterioration sensitivity at the first estimated value is lower than the deterioration sensitivity at the second estimated value, before the cooling device is operated by the electric power from the battery, a user is notified of a proposal to operate the cooling device by the electric power from the battery.

According to (3), before the cooling device is operated by the electric power from the battery, a user is notified of a proposal to operate the cooling device by the electric power from the battery, and thus, it is possible to prevent the SOC from being lowered without the user being aware of it.

(4) The battery temperature adjustment system according to (3), in which when the user permits the proposal, the control device operates the cooling device by the electric power from the battery.

According to (4), when the user permits the proposal, the control device operates the cooling device by the electric power from the battery, and thus, it is possible to lower the SOC with the permission of the user.

(5) The battery temperature adjustment system according to (3) or (4), in which
when the user does not permit the proposal, the control device operates the cooling device by the electric power from the external power source.

According to (5), when the user does not permit the proposal, the control device operates the cooling device by the electric power from the external power source, and thus, it is possible to select an electric power source for the cooling device according to the intention of the user.

The invention claimed is:

1. A battery temperature adjustment system comprising:
a battery configured to store electric power from an external power source, and supply electric power to a motor as a drive source of a vehicle;
a cooling device to which the electric power from the external power source and the electric power from the battery are selectively supplied and configured to cool the battery; and
a control device configured to control the cooling device to adjust a state of charge of the battery and a battery temperature, wherein:
the control device stores a deterioration sensitivity map in which a deterioration sensitivity is preset according to the state of charge and the battery temperature, or is configured to calculate a deterioration sensitivity according to the state of charge and the battery temperature; and
to operate the cooling device when the vehicle is connected to the external power source, the control device is configured to select between the electric power from the battery and the electric power from the external power source based on the deterioration sensitivity.

2. The battery temperature adjustment system according to claim 1, wherein:
the control device estimates:
a first estimated value of the state of charge and the battery temperature after cooling when the cooling device is operated by the electric power from the external power source; and
a second estimated value of the state of charge and the battery temperature after cooling when the cooling device is operated by the electric power from the battery;
when the vehicle is connected to the external power source, and when the deterioration sensitivity at the second estimated value is lower than the deterioration sensitivity at the first estimated value, the control device operates the cooling device by the electric power from the battery; and
when the vehicle is connected to the external power source, and when the deterioration sensitivity at the first estimated value is lower than the deterioration sensitivity at the second estimated value, the control device operates the cooling device by the electric power from the external power source.

3. The battery temperature adjustment system according to claim 2, wherein
when the deterioration sensitivity at the first estimated value is lower than the deterioration sensitivity at the second estimated value, before the cooling device is operated by the electric power from the battery, a user is notified of a proposal to operate the cooling device by the electric power from the battery.

4. The battery temperature adjustment system according to claim 3, wherein
when the user permits the proposal, the control device operates the cooling device by the electric power from the battery.

5. The battery temperature adjustment system according to claim 3, wherein
when the user does not permit the proposal, the control device operates the cooling device by the electric power from the external power source.

* * * * *